United States Patent
Shah et al.

(12) 
(10) Patent No.: US 6,429,247 B1
(45) Date of Patent: Aug. 6, 2002

(54) ROSIN-FATTY ACID VINYLIC EMULSION COMPOSITIONS

(75) Inventors: Rajnikant Shah, Mt. Pleasant; Warunee S. Sisson; Thomas M. Sisson, both of Daniel Island, all of SC (US)

(73) Assignee: Westvaco Corporation, Stamford, CT (US)

( * ) Notice: Subject to any disclaimer, the term of this patent is extended or adjusted under 35 U.S.C. 154(b) by 67 days.

(21) Appl. No.: 09/738,335

(22) Filed: Dec. 15, 2000

(51) Int. Cl.$^7$ .................. C08L 93/04; C08K 5/09; C09D 125/00; C09D 133/00; C09D 151/00
(52) U.S. Cl. .............. 524/270; 524/272; 524/300; 524/457; 524/458; 524/460; 524/764; 524/798
(58) Field of Search ................ 524/270, 272, 524/300, 457, 458, 460, 764, 792

(56) References Cited

U.S. PATENT DOCUMENTS

| | | |
|---|---|---|
| 3,412,054 A | 11/1968 | Milligan et al. |
| 3,480,578 A * | 11/1969 | Witt ................... 260/23.7 |
| 3,716,389 A | 2/1973 | Voskuil et al. |
| 3,770,486 A | 11/1973 | Hopermann |
| 4,116,903 A | 9/1978 | Lietz et al. |
| 4,317,755 A | 3/1982 | Gregory |
| 4,414,370 A | 11/1983 | Hamielec et al. |
| 4,529,787 A | 7/1985 | Schmidt et al. |
| 4,546,160 A | 10/1985 | Brand et al. |
| 4,591,518 A | 5/1986 | Schillinger et al. |
| 4,649,175 A | 3/1987 | Inoue et al. |
| 4,812,508 A | 3/1989 | Makhlouf et al. |
| 4,839,413 A | 6/1989 | Kiehlbauch et al. |
| 5,008,329 A | 4/1991 | Abe et al. |
| 5,096,959 A | 3/1992 | Jones et al. |
| 5,116,945 A | 5/1992 | Osawa et al. |
| 5,182,326 A * | 1/1993 | LeBlanc et al. ............ 524/514 |
| 5,216,064 A * | 6/1993 | Rivera et al. .............. 524/457 |
| 5,370,939 A | 12/1994 | Williams et al. |
| 5,656,679 A | 8/1997 | Hutter |
| 5,948,546 A | 9/1999 | Bafford et al. |
| 5,965,647 A | 10/1999 | Catena et al. |
| 6,020,438 A | 2/2000 | Lubnin et al. |

FOREIGN PATENT DOCUMENTS

EP 0017199 10/1980

OTHER PUBLICATIONS

Sisson et al.; *Acrylic Polymer Emulsions for Adhesion to Low Energy Substrates,* American ink Maker, vol. 78, pp. 44–47 (Aug. 2000).

* cited by examiner

Primary Examiner—David W. Wu
Assistant Examiner—K C Egwim
(74) Attorney, Agent, or Firm—Daniel B. Reece, IV; Terry B. McDaniel; Richard L. Schmalz

(57) ABSTRACT

A rosin fatty acid vinylic emulsion composition produced by (A) polymerizing a mixture of vinylic monomers in the presence of a fatty acid rosin mixture comprising a mixture of fatty acids and rosin, at temperature in the range of about 135° C. to about 175° C., to produce a rosin-fatty acid vinylic polymer having a weight average molecular weight in the range of 4,000 to about 12,000; and (B) subsequently emulsion polymerizing another mixture of vinylic monomers in the presence of the rosin-fatty acid vinylic polymer of step A at temperature in the range of about 20° C. to about 100° C., to produce a rosin-fatty acid vinylic emulsion composition with polymers having a weight average molecular weight in the range of about 40,000 to about 200,000.

19 Claims, No Drawings

ROSIN-FATTY ACID VINYLIC EMULSION COMPOSITIONS

FIELD OF INVENTION

This invention relates to novel rosin-fatty acid vinylic emulsion compositions and the process for preparing the same. In particular, the invention relates to novel rosin-fatty acid vinylic emulsion compositions which exhibit properties that make them useful as water-borne vehicles for coatings on various substrates.

BACKGROUND OF THE INVENTION

Polymeric resins are commonly employed in a variety of different uses. For example, polymeric resins may be employed as support resins for ink formulations. Typical surfactant-based emulsion polymerization products generally do not have the rheology properties desired for graphic arts and coatings applications (i.e. film build, flow and leveling, and stability). It is, therefore, a common practice to add to the emulsion polymerization a low molecular weight water or alkaline soluble polymer (also referred to in the art as a resin) in place of, or in addition to, a surfactant in order to improve the stability and rheology properties of the emulsion.

Supported emulsions are commonly employed in paints, clear coatings, floor finishes, leather treatments, cement formulations, functional paper coatings, and graphic art applications. The latter encompasses pigmented (ink) and non-pigmented (overprints and functional coatings) formulations. A support emulsion is comprised of two polymers, one that represents the support resin and a second polymer that is dispersed into the support. The second polymer may be dispersed through agitation or actually be polymerized in the presence of the support resin. Supported emulsions add stability while enhancing the flow characteristics of the formulation (thereby resulting in higher gloss and clarity). Traditional polymer supports are commonly produced by the polymerization of acrylic acid or another vinylic acid and other vinyl monomers (see U.S. Pat. Nos. 4,839,413 and 5,216,064, which are hereby incorporated by reference). Other reactants and additives include initiators, solvents, and chain transfer agents. Upon completion of the reaction, any solvents employed may be removed yielding a support polymer. The support polymer then can be solubilized in a basic aqueous medium.

However, major problems exist with the traditional methods of producing polymer resins. For example, these methods require the use of environmentally adverse hydrocarbon solvents. Moreover, as these solvents are not usable or desirable in water-based ink or overprint formulations, the solvents must be stripped from the resulting acrylic polymers (thereby causing a yield loss). This stripping step also adds expense to the process due to both the losses of yield and the energy consumed in performing the stripping. Also, these methods must utilize chain transfer agents to regulate the molecular weight of the resulting support resin.

In the present invention, rosin-fatty acid vinylic polymers used as support resins for emulsion polymerization are produced preferably in bulk condition, thereby eliminating the costly stripping process for resin production. In addition, the resin polymerization can be performed at a higher temperature than traditional solution polymerization reactions. Moreover, as the present invention employs a lower amount of free radical initiator and little or no chain transfer agent, the resulting resins can be produced at a reduced cost (and unpleasant odors associated with chain transfer agents can be avoided).

Accordingly, one objective of this invention is to disclose a method of producing support resins comprised of rosin-fatty acid vinylic polymers and a method of producing emulsions using these rosin-fatty acid vinylic polymers as the support resins.

Although water-based inks are comprised of various components, the emulsion polymer (ink vehicle) is principally responsible for adhesion to the substrate. Adhesion is a quantitative description of the work of detachment between two phases under conditions of failure.

Polyolefin film substrates are difficult surfaces on which to achieve high adhesion due to their high surface energies and lack of functionality. Water-based inks in particular do not adhere well to film surfaces. Prior attempts to improve the adhesion of water-based inks include methods of increasing the polarity of the emulsion polymer vehicle through changes in monomer compositions including incorporation of vinyl chloride (see: Sisson et al., American Ink Maker, Vol. 78, pp. 44–47, August 2000 and U.S. Pat. No. 6,020,438). Amino-functional ink vehicles are also a way of obtaining adhesion to film substrates (U.S. Pat. No. 5,948,546). While these systems enhance adhesion, they have not found wide spread usage due to compatibility problems with the other ink components.

Therefore, an objective of this invention is to solve these problems by disclosing a rosin-fatty acid vinylic emulsion composition having improved adhesion to various substrates, including plastic, wood, metal, and flexible substrates like film and foil.

Alkyds generally are formed by the esterification polymerization of polyols and polybasic acid. The reaction mixture may also include monobasic acids, fatty acids and the like.

Due to their desired physical properties and low material costs, solvent-based alkyds have long been widely used as ingredients in coating compositions for various materials. For example, films resulting from aqueous alkyd coating compositions may be used as protective coatings for farm equipment and as a finish or refinish for trucks and automobiles. They are also extensively employed in architectural varnishes and enamels which require high gloss. However, rising health and environmentally concerns over the emission of organic compounds from solvent-based paints have resulted in strict regulation of the amount of volatile organic compounds (VOC) emitted from applied paints. In addition, rapid advances in technical innovation require improvements in the properties of coatings compositions. For example, it is desired that pigments be dispersed more effectively with higher stability in order to produce coating finishes having improved gloss (i.e., gloss at 60°) and distinctiveness-of-image gloss (i.e., gloss at 20°). Moreover, these coatings often exhibit problems with adhesion, flexibility, and resistance to corrosion and chemicals.

In an attempt to comply with the challenges of increased regulation and improved performance, industry has devoted much effort toward developing water-borne and high solid alkyds coatings which employ far lower amounts of organic solvents than conventional coatings. In spite of these substantial efforts, a need exists in the industry for such improved water-borne alkyds and high solid alkyds coatings.

High solid alkyds which employ less organic solvent than conventional alkyds often suffer from a dramatic increase in viscosity as the amount of solvent employed decreases. It has often been necessary for a high solid system to use lower molecular weight resins in order to maintain a workable paint viscosity. However, such systems tend not to develop the same hardness and through-dry in thick films in the same amount of time when compared to systems using higher molecular weight materials. Moreover, the additional functionality (which may build up the coating molecular weight after application) usually required for such high solid systems commonly results in adverse performance and higher production costs. One example of the use of additional functionality is to increase the level of unsaturated fatty acid to ensure sufficient crosslinking to achieve acceptable coating properties. One of the major drawbacks in the use of such high solid alkyds is the development of severe yellowing in the cured coatings due to the increased level of unsaturated fatty acid. U.S. Pat. No. 5,370,939 attempts to address this yellowing problem in alkyd coatings by teaching the incorporation of polyhydroxy based allyl ethers into alkyds to replace a part of or all of, the fatty acid. In U.S. Pat. No. 4,591,518, alkyd resins containing pendant polymerizable unsaturated groups attached to the alkyd through urethane linkages are claimed to improve high solid performance.

Water-borne alkyds coatings which use water as a dispersing medium are mainly emulsions and water-dispersible resins. Although showing an impressive success in replacing organic solvent coatings in many applications, water-borne alkyd coatings have not been able to satisfy the need of the coating industry in many applications because of certain inherent problems (e.g., insufficient gloss, water sensitivity, hydrolytic stability, and the difficulty of controlling water evaporation after application).

Coating compositions of acrylic polymers commonly provide finishes with excellent appearance, weatherability and durability. Coatings compositions of alkyds are known for their excellent gloss and their ability to be cured at ambient temperature. However, such alkyd coating compositions are also known for their inferior weatherability and durability when compared to acrylic finishes. Tremendous efforts have, therefore, been concentrated on developing interpolymers which are the combination of acrylic polymer and alkyd polymer.

Simply blending acrylic polymers and alkyds does not provide an optimum finish, as these acrylic polymer and alkyds are generally not compatible.

In the art of emulsions utilizing alkyd resins, interpolymer emulsions of acrylic polymers and alkyds have been prepared typically by following either one of two different procedures. In one procedure, an alkyd resin and compatible vinyl emulsion are separately formed, and then admixed together. By the other procedure, vinylic monomers are in situ polymerized in the presence of a preformed solution or dispersion of alkyd resin so as to provide an interpolymer system. The in-situ polymerization can take place with or without a conventional emulsifier. An example of this is U.S. Pat. No. 4,116,903, where a neutralized, aqueous solution of alkyd resin is utilized as sloe emulsifier to stabilize the in-situ vinylic emulsion polymerization.

In U.S. Pat. No. 4,273,690, an interpolymer is produced by grafting alkyd resin to the acrylic polymer backbone through urethane moiety. A number of patents have described the production of water-borne alkyds via the use polyurethane dispersion (see U.S. Pat. No. 3,412,054 and European Patent Application No. EP 0017199A1). Polyurethane dispersions or isocyanate compounds (which is the precursor for urethane moiety) are quite costly, and result in much higher production costs for water-borne alkyds when compared to conventional solventborne alkyds.

The water-borne alkyds often exhibit poor hydrolytic stability, in that they often do not have the capability to withstand storage for long periods of time at the high storage temperatures often found in warehousing and manufacturing facilities. Hydrolysis of alkyds may result in the separation of the coatings composition into phrases, accompanied by the settling of solid materials to the bottom or substantial reductions in viscosity and the diminished performance of the coating materials. U.S. Pat. No. 5,096,959, attempts to improve the hydrolytic stability of water-borne alkyds by reacting the base alkyd commonly used for such compositions with a polybasic acid composition comprising one or more cycloaliphatic polycarboxylic acids. However, this approach requires the use of costly cycloaliphatic polycarboxylic acids, thereby increasing production costs.

Therefore, another objective of this invention is to disclose rosin-fatty acid vinylic emulsion compositions that are useful as binders in paint, lacquers and coating compositions exhibiting water-borne alkyds performance with improved hydrolytic stability.

An attempt to improve the adhesion property of water-borne alkyds is disclosed in U.S. Pat. No. 4,649,175, which teaches the incorporation of nitrogen-containing compounds into the alkyds. This incorporation, however, increases the cost of production of such water-borne alkyds.

Another objective of this invention is to disclose a coatings composition comprising rosin-fatty acid vinylic emulsion compositions which exhibits excellent pigment dispersion and adhesion properties.

A further objective of this invention is to disclose a rosin-fatty acid vinylic emulsion compositions that providing a finish that could be cured at ambient and higher temperature with or without the crosslinkers and has an excellent appearance such as gloss (60°) and distinctiveness-of-image gloss (gloss at 20°), excellent physical properties like resistance to corrosion and chemicals, great elasticity and flexibility, and excellent adhesion to all types of coated and uncoated substrates.

In another aspect, the present invention provides rosin-fatty acid vinylic emulsion compositions which, when cured at ambient temperatures or when cured with or without a crosslinker under bake conditions, have gloss levels that are higher than those attainable with traditional vinylic polymer emulsions and gloss levels that are comparable or better than those of solventborne alkyds.

The emulsion compositions of the present invention can be formulated to pigmented or non-pigmented (clear) coatings. Such formulations exhibit the performance of waterborne alkyds, are easy to work with, and produce film coatings having excellent flow properties, high elasticity, outstanding weather resistance, good durability, superior gloss and color stability, exceptional chemical and water resistance, and less yellowing upon time. Wood varnishes produced from the compositions of the invention exhibit good penetration and good protective effects.

Another object of this invention is to disclose rosin-fatty acid vinylic emulsion compositions which exhibit ultra high initial gloss, excellent gloss and color stability, exceptional stain removal and stain resistance, and unique flexibility and elastomeric properties which allow them to be useful for formulating vehicles for water-based paints and other coating formulations.

A further object of this invention is to disclose rosin-fatty acid vinylic emulsion compositions which, when formulated into a water-based ink, impart flexibility to the ink.

Yet another object of this invention is to disclose rosin-fatty acid vinylic emulsion compositions which, when formulated into a water-based ink, improve the adhesion of the ink to film and foil substrates.

A further object of this invention is to disclose rosin-fatty acid vinylic emulsion compositions which, when formulated into a water-based overprint varnish, yield a high degree of gloss.

SUMMARY OF THE INVENTION

The objects of this invention are met via the production of rosin-fatty acid vinylic emulsion compositions using a method that employs rosin-fatty acid vinylic polymers as support resins for the emulsion polymerization reaction. These rosin-fatty acid vinylic emulsion compositions have enhanced properties (such as ultra high gloss, pigment dispersion, flexibility, adhesion, stain resistance, gloss and color stability, and elastomeric properties), which make the compositions highly desirable for a number of uses, including the formulation of overprint varnishes for coatings on paper and cellulose-based materials, the formulation of architectural and industrial paints for coating wood, plastic and metal substrates, and the formulation of ink vehicles for coating film and foil substrates.

Water-borne inks formulated with the rosin-fatty acid vinylic emulsion compositions exhibit excellent gloss, enhanced stability and increased adhesion to flexible substrates. Water-borne paints formulated with the rosin-fatty acid vinylic emulsion compositions exhibit excellent flexibility and gloss, an increased gloss and color stability over time.

DESCRIPTION OF THE PREFERRED EMBODIMENT

The rosin-fatty acid vinylic emulsion compositions of the present invention are hybrid compositions containing a solventborne rosin-fatty acid component and a waterborne acrylic component on the same molecule. This unique combination gives the emulsion composition properties of both solventborne polymers and waterborne polymers. For example, the emulsion compositions have characteristics which permit the formulation of coatings exhibiting ultra-high gloss, excellent lay and hold-out properties, superior water and chemical resistances with sufficient crosslinking structures, compatibility with highly pigmented systems, exceptional grease resistance and resolubility. These characteristics allow the formulated coatings to function as good overprint varnish vehicles and ink vehicles on paper and cellulose-based materials. Additionally, the emulsion compositions further exhibit enhanced flow and leveling characteristics, package stabilities, exceptional stain resistance and stain removal, and excellent wet and dry adhesion to multiple substrates. These properties allow the emulsion compositions to function as superior binders in clear and pigmented paints for architectural, industrial, and maintenance coatings applications on metal, plastic, and wood substrates. When employed for coatings applications, the emulsion compositions allow an enhanced waterborne application having performances normally associated only with solventborne alkyd binders. Indeed, the emulsion compositions have proven to be superior to many solventborne alkyds in both gloss and color stability.

Due to increasing environmental concerns, industry has concentrated intensive efforts in the area of waterborne alkyds. However, the use of waterborne alkyds in the coatings market has heretofore been limited because of the higher production costs and lower gloss characteristics associated with traditional waterborne alkyds when compared to solventborne alkyds. Moreover, existing waterborne alkyds often suffer from hydrolytic instability (which can result in poor package stability and performance consistency). As the emulsion compositions of the present invention are hybrids of rosin-fatty acid acrylic technologies, the compositions exhibit acrylic characteristics of hydrolytic stability, color and gloss stability. At the same time, the emulsion compositions also exhibit polyester rosin-fatty acid character for flexibility and elasticity - which allow the emulsions to function as excellent waterborne ink vehicles and coatings binders for flexible substrates (i.e. plastic, film, foil, and the like).

To produce the emulsions of this invention, the vinylic monomers are copolymerized in an aqueous medium by adding the vinylic monomers to the rosin-fatty acid vinylic polymer solution, along with surfactants, if desired, and polymerizing catalysts or initiators. In certain cases, chain transfer agent could be employed to control molecular weight of the emulsion.

The rosin-fatty acid vinylic emulsion compositions of the present invention comprises the reaction products produced by:
(A) reacting in a first polymerization reaction:
  (1) about 20.0% to about 60.0% by total weight of the reactants of a fatty acid rosin mixture comprising:
    (a) about 10.0% to about 90.0% by total weight of the fatty acid rosin mixture of fatty acid, and
    (b) about 10.0% to about 90.0% by total weight of the fatty acid rosin mixture of rosin; and
  (2) about 40.0% to about 80.0% by total weight of the reactants of a monomer mixture comprising:

(a) about 15.0% to about 45.0% by total weight of the monomer mixture of a member selected from the group consisting of acrylic acid, methacrylic acid, fumaric acid, maleic anhydride, and combinations thereof, (b) about 55.0% to about 85.0% by total weight of the monomer mixture of a member selected from the group consisting of vinylic monomers and combinations thereof, (c) about 0.5% to about 5.0% by total weight of the monomer mixture of a polymerization initiator, (d) up to about 4.0% by total weight of the monomer mixture of a chain transfer agent, and (e) up to about 30% by total weight of the monomer mixture of a hydrocarbon solvent, at a temperature in the range of about 13 5° C. to about 175° C. to produce a rosin-fatty acid vinylic polymer having a weight average molecular weight in the range of about 4,000 to about 12,000; and (B) further reacting in an emulsion polymerization reaction:

(1) about 5.0% to about 90.0% by total weight of the reactants of the rosin-fatty acid vinylic polymer of step A, (2) about 10.0% to about 95.0% by total weight of the reactants of a member selected from the group consisting of vinylic monomers and combinations thereof, and (3) about 0.5% to about 4.0% by total weight of the reactants of a polymerization initiator, (4) up to about 4.0% by total weight of the reactants of a chain transfer agent, and (5) up to about 4.0% by total weight of the reactants of a surfactant, at a temperature in the range of about 20° C. to about 100° C. to produce a rosin-fatty acid vinylic emulsion composition having a weight average molecular weight in the range of about 40,000 to about 200,000.

Preferred rosin-fatty acid vinylic emulsion compositions comprise the reaction products produced by:

(A) reacting in a first polymerization reaction:

(1) about 20.0% to about 60.0% by total weight of the reactants of a fatty acid rosin mixture comprising:

(a) about 20.0% to about 50.0% by total weight of the fatty acid rosin mixture of fatty acid, and (b) about 50.0% to about 80.0% by total weight of the fatty acid rosin mixture of rosin; and (2) about 40.0% to about 80.0% by total weight of the reactants of a monomer mixture comprising:

(a) about 20.0% to about 25.0% by total weight of the monomer mixture of a member selected from the group consisting of acrylic acid, methacrylic acid, fumaric acid, maleic anhydride, and combinations thereof, (b) about 60.0% to about 70.0% by total weight of the monomer mixture of a member selected from the group consisting of vinylic monomers and combinations thereof, (c) about 1.0% to about 3.0% by total weight of the monomer mixture of a polymerization initiator, (d) about 0.5% to about 2.0% by total weight of the monomer mixture of a chain transfer agent, and (e) about 1.0% to about 4.0% by total weight of the monomer mixture of a hydrocarbon solvent, at a temperature in the range of about 140° C. to about 1 70° C. to produce a rosin-fatty acid vinylic polymer having a weight average molecular weight in the range of about 5,000 to about 11,000; and (B) further reacting in an emulsion polymerization reaction:

(1) about 20.0% to about 60.0% by total weight of the reactants of the rosin-fatty acid vinylic polymer of step A, (2) about 40.0% to about 80.0% by total weight of the reactants of a member selected from the group consisting of vinylic monomers and combinations thereof, and (3) about 0.5% to about 1.5% by total weight of the reactants of a polymerization initiator, (4) up to about 4.0% by total weight of the reactants of a chain transfer agent, and (5) up to about 4.0% by total weight of the reactants of a surfactant, at a temperature in the range of about 60° C. to about 85° C. to produce a rosin-fatty acid vinylic emulsion composition having a weight average molecular weight in the range of about 40,000 to about 180,000.

The first polymerization reaction used to produce the rosin-fatty acid vinylic polymer is a melt polymerization reaction in which no water is employed. Reaction temperatures suitable for use in the first polymerization reaction of the present invention are within the range of about 135° C. to about 175° C.; with the preferred temperatures being in the range of about 140° C. to about 170° C. These rosin-fatty acid vinylic polymers have characteristics that differ from the traditional melt blends of flake acrylic fatty acid rosin. For example, the low molecular weights of the rosin-fatty acid vinylic polymers enable the polymers to be neutralized at high solid levels while maintaining low viscosities. The low molecular weight coupled with the polymer's high levels of functional carboxyl units permits the production of rosin-fatty acid vinylic emulsion compositions that are well-suited for use in water-based inks, paints, and other coating applications as these emulsions tend to improve both the gloss and the leveling properties of formulated inks as well as the stability of formulated paints.

In the first polymerization reaction, the rosin and fatty acid function as solvents in the polymerization of the acrylic monomers. Additionally, while a portion of the fatty acid and the rosin component remains unreacted, some of the fatty acid and rosin becomes graft polymerized onto the acrylic. It is preferred to employ a bulk polymerization process for the first polymerization reaction. The residence time for such bulk processes is commonly in the range of about 3 hours to about 10 hours. However, where desired the first polymerization reaction may be conducted via the use of a continuous stirred polymerization process. The residence time for such continuous processes is commonly in the range of about 90 minutes to about 6 hours; with the preferred residence time being in the range of about 2 hours to about 3 hours.

The rosin-fatty acid vinylic polymers of the first polymerization reaction have a weight average molecular weight in the range of about 4,000 to about 12,000; with the preferred molecular weight being in the range of about 5,000 to about 11,000.

Rosin-fatty acid vinylic polymers which are suitable for use as a support resin for the emulsion polymerization reaction have an acid number commonly in the range of about 175 to about 500; with the preferred range being about 190 to about 230. However, the acid number range will vary depending upon the respective application of the rosin-fatty acid vinylic emulsion compositions. For example, when aqueous dispersions of the rosin-fatty acid vinylic compositions are employed as surface sizing compositions for cellulosic materials, a suitable acid number is in the range of about 50 to about 500; with the preferred range being about 50 to about 250. It is well within the ability of one skilled in the art to determine proper acid number ranges for various applications.

Fatty acids which are suitable for use in the present invention include those fatty acids which contain a range of carbon atoms from about $C_{12}$ to about $C_{24}$, with the preferred range being from about $C_{16}$ to $C_{20}$. It is further preferred that the fatty acid be vegetable or tall oil based. It is most preferred that the fatty acid be tall oil based and contain from about 15% to about 18% conjugated double bonds.

While from about 10% to about 90% by total weight of the fatty acid rosin mixture may be fatty acid, a preferred range of fatty acid is from about 20% to about 50% by total weight of the mixture.

Rosins which are suitable for use in the present invention include wood rosin, tall oil rosin, gum rosin, and the like. The use of tall oil rosin is preferred. While from about 10% to about 90% by total weight of the fatty acid rosin mixture may be rosin, a preferred range of rosin is from about 50% to about 80% by total weight of the mixture.

While from about 15% to about 45% by total weight of the monomer mixture employed in the first polymerization reaction may be a member selected from the group consisting of acrylic acid, methacrylic acid, fumaric acid, maleic anhydride, and combinations thereof; a preferred range is from about 20% to about 25% by total weight of the mixture.

While from about 55% to about 85% by total weight of the monomer mixture may be a member selected from the group consisting of vinylic monomers and combinations thereof; a preferred range is from about 60% to about 70% by total weight of mixture.

Vinylic monomers which are suitable for use in both the first polymerization reaction and the emulsion polymerization reaction in the present invention include styrenic monomers, acrylic monomers, methacrylic monomers, ethylenic monomers, and the like. In the first polymerization reaction, it is preferred that the vinylic monomers be a mixture, preferably including at least one monoalkenyl aromatic monomer and at least one acrylic monomer. The monoalkenyl aromatic monomer to be employed includes, for example, alpha-methyl styrene, styrene, vinyl toluene, tertiary butyl styrene, ortho-chlorostyrene and mixtures thereof.

The term "acrylic monomer" as employed herein includes members of the group consisting of acrylic acid, methacrylic acid, acrylic acid esters, methacrylic acid esters, derivatives of acrylic acid, derivatives of methacrylic acid, and combinations thereof. Examples of suitable acrylic and methacrylic ester monomers include the $C_1$–$C_{30}$ alkyl ester derivatives. Methacrylic esters suitable for use in the present invention include, but are not limited to, the following: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Typical acrylate esters suitable for use in the present invention include methyl acrylate, ethyl acrylate, n-propyl acrylate, isopropyl acrylate, n-butyl acrylate, n-decyl acrylate, 2-ethylhexal acrylate, and the like.

Typical methacrylic acid derivative acrylic monomers suitable for use in the present invention include methacrylic acid derivatives such as: methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, and the like.

Acrylic acid derivatives suitable for use as the acrylic monomer include: acrylic acid and its salts, acrylonitrile, acrylamide, methyl alpha-chloroacrylate, methyl 2-cyanoacrylate, N-ethylacrylamide, N,N-diethylacrylamide acrolein, and the like.

Typical ethylenic monomers suitable for use in the present invention include vinyl acetate, derivatives of vinyl acetate, vinyl chloride, derivatives of vinyl chloride, vinyl pyridine, vinyl pyrollidone, sodium crotonate, methyl crotonate, crotonic acid, maleic anhydride, and the like.

For the first polymerization reaction, from about 0.5% to about 5.0% by total weight of the monomer mixture is a polymerization initiator, with a preferred range being from about 1.0% to about 3.0% by total weight of the mixture. Polymerization initiators which are suitable for use in the first polymerization reaction include, but are not limited to, the following: t-butyl peroxide, t-butyl peroxybenzoate, t-butyl peroctoate, cumene hydroperoxide, azobisisobutyronitrile, benzoyl peroxide, and combinations thereof.

For the emulsion polymerization reaction, from about 0.5% to about 4.0% by total weight of the reactants is a polymerization initiator, with a preferred range being from about 0.5% to about 1.5% by total weight of the reactant mixture. The type of polymerization initiator suitable is known in the art to depend upon the desired temperature for the reaction. Suitable initiators include thermal initiators, redox initiators, and combinations thereof. Thermal initiators which are suitable for use include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, isopropyl peroxycarbonate, and combinations thereof. Suitable redox initiators include, but are not limited the following: sodium persulfate-sodium formaldehyde sulfoxylate, cumene hydroperoxide-sodium metabisulfite, potassium persulfate-sodium metabisulfite, potassium persulfate-sodium bisulfite, cumene hydroperoxide-iron (II) sulfate, and combinations thereof.

Where desired, a chain transfer agent may be employed in both polymerization reactions. Chain transfer agents which are suitable for use in the present invention include, but are not limited to, the following: dodecyl mercaptan, mercaptoacetic acid, mercaptopropionic acid, octyl mercaptan, 2-mercaptoethanol, and combinations thereof. While up to about 4.0% by total weight of the monomer mixture may be a chain transfer agent; where employed it is preferred to use an amount in the range of from about 0.5% to about 2.0% by total weight of the mixture.

Where desired, a hydrocarbon solvent may be employed in the first polymerization reaction. Suitable hydrocarbon solvents include aromatic solvents, aliphatic solvents, and combinations thereof. While up to about 30.0% by total weight of the monomer mixture may be a hydrocarbon solvent; where employed it is preferred to use an amount in the range of about 1.0% to about 4.0% by total weight of the mixture.

An emulsion polymerization reaction is employed to produce the rosin-fatty acid vinylic emulsion compositions. Reaction temperatures suitable for use in the emulsion polymerization reaction of the present invention are within the range of about 20° C. to about 100° C.; with the preferred temperatures being in the range of about 60° C. to about 85° C. The resulting rosin-fatty acid vinylic emulsion compositions have a weight average molecular weight in the range of about 40,000 to about 200,000; with the preferred molecular weights being in the range of about 40,000 to about 180,000.

Where desired, a surfactant may be employed in the emulsion polymerization reaction in an amount up to about 4.0% by weight of the reactants. Surfactants which are suitable for use in the present invention include members selected from the group consisting of anionic surfactants, non-ionic surfactants, and combinations thereof. Suitable anionic surfactants include alkyl sulfates, ether sulfates, phosphate esters, sulfonates, and the like. Suitable non-ionic surfactants include alcohol ethoxylates, alkylphenol ethoxylate, phenol ethoxylate, block copolymers, and the like. Anionic and non-ionic surfactants containing polymerizable groups (known in the art as "polymerizable surfactants") are also suitable for use in the present invention.

It is well within the ability of one skilled in the art to produce an aqueous base suitable for use in dissolving the rosin-fatty acid vinylic emulsion compositions. Such aqueous bases include those produced using organic solvents and various inorganic solvents (such as sodium hydroxide, potassium hydroxide, ammonium hydroxide, amines, sulfates, and the like).

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

A rosin-fatty acid vinylic emulsion composition was prepared via the following method. A reactor vessel equipped with a thermometer, stirrer, monomer feed pump, and a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials from the resulting rosin-fatty acid vinylic polymer.

A round bottom flask was equipped with stirrer, thermometer, nitrogen inlet and reflux condenser. To the flask was added 3283 g of deionized water (DIW), which was heated to 75° C. Then 1454 g of the rosin-fatty acid vinylic polymer was added to the flask. Ammonium hydroxide was subsequently added to the solution until a pH of 9.0–9.5 was obtained; at which time 303.9 g of ANTAROX L-61 (an non-ionic block copolymeric surfactant commercially available from Rhodia) was added and the temperature of the solution increased to 81° C. An initiator solution composed of 16.4 g ammonium persulfate and 49.3 g DIW was charged to the flask. Fifteen minutes after this addition was completed, 723 g of styrene was charged to the flask over a period of 30 minutes. Sixty minutes after this addition was completed, a second monomer mixture (composed of 632 g styrene and 386 g butyl acrylate) and a second initiator solution (composed of 20.5 g ammonium persulfate and 477.8 g DIW) were charged into the reaction over a 120 minute period. Upon completion of the feed, the reaction was held at temperature for 60 minutes, then allowed to cooled down to room temperature and filtered. The resulting rosin-fatty acid vinylic emulsion composition (hereinafter referred to as Emulsion No. 1) contained 44% solids and had a pH of 8.5.

EXAMPLE 2

A rosin-fatty acid vinylic emulsion composition was prepared via the following method. A reactor vessel equipped with a thermometer, stirrer, monomer feed pump, and a blanket nitrogen intake line was charged at room temperature with a mixture of 104 grams of L-5 Fatty Acid (a tall oil fatty acid composition commercially available from Westvaco Corporation) and 96 grams of Rosin SS (a tall oil rosin composition commercially available from Westvaco Corporation). The mixture was heated under a nitrogen blanket to 175° C. and held at that temperature, whereupon Charge A was added, with stirring, over a three hour period. Charge A consisted of a mixture of 160 grams of styrene, 237 grams of α-methyl styrene, 180 grams of acrylic acid, 4 grams of di-tert-butyl peroxide, and 8 grams of cumene hydroperoxide. After the addition of Charge A was completed, the reaction mixture was held at 175° C. for an additional hour. At that time 4 grams of cumene hydroperoxide was added and the reaction mixture was held at 175° C. for an additional two hours. The temperature of the reaction mixture was then raised to 180° C. and vacuum was applied to remove any unreacted materials from the resulting rosin-fatty acid vinylic polymer.

A round bottom flask was equipped with stirrer, thermometer, nitrogen inlet and reflux condenser. To the flask was added 474 g of deionized water (DIW), which was heated to 75° C. Then 130 g of the rosin-fatty acid vinylic polymer was added to the flask. Ammonium hydroxide was subsequently added to the solution until a pH of 8.5–9.0 was obtained; at which time 10 g of Tergitol 15-S-9 (a nonionic surfactant commercially available from Union Carbide) was added and the temperature of the solution increased to 82° C. An initiator solution composed of 3.5 g ammonium persulfate and 18 g DIW was charged to the flask. Fifteen minutes after this addition was completed, a monomer mixture (composed of 220 g styrene and 54 g butyl acrylate) was charged into the reaction over a 120 minute period. Upon completion of the feed, the reaction was held at temperature for 60 minutes, then allowed to cooled down to room temperature and filtered. The resulting rosin-fatty acid vinylic emulsion composition (hereinafter referred to as Emulsion No. 2) contained 44% solids and had a pH of 8.5.

EXAMPLE 3

An interior gloss paint incorporating the rosin-fatty acid vinylic emulsion composition of Example 1 (Emulsion No. 1) was prepared at pigment volume concentration (PVC) of 18.8%, and volume solid of 32.0% as shown in Table I below.

TABLE I

Interior Gloss Paint Containing Rosin-Fatty Acid Vinylic Emulsion

|  | Pounds | Gallons |
| --- | --- | --- |
| GRIND |  |  |
| Water | 52.4 | 6.29 |
| Propylene glycol | 17.3 | 2.00 |
| TAMOL 165A[1] | 11.1 | 1.25 |
| IGBEAL CTA 639W[2] | 2.2 | 0.25 |
| Ammonium hydroxide, 28% | 1.9 | 0.25 |
| BYK 022[3] | 1.0 | 0.12 |
| ACRYSOL RM-825[4] | 4.4 | 0.50 |

TABLE I-continued

Interior Gloss Paint Containing Rosin-Fatty Acid Vinylic Emulsion

|  | Pounds | Gallons |
| --- | --- | --- |
| Dupont R-706[5] | 200.0 | 6.00 |
| Water | 25.0 | 3.00 |
| DISPERSE |  |  |
| Water | 48.5 | 5.88 |
| Emulsion No. 1 | 567.3 | 65.21 |
| NUOCURE CK-10[6] | 8.1 | 1.00 |
| Colioid 645[7] | 1.9 | 0.25 |
| SANTICIZER 160[8] | 9.3 | 1.00 |
| Dow DB[9] | 15.9 | 2.00 |
| Dow DPnB[10] | 30.2 | 4.00 |
| ACRYSOL RM-825 | 8.7 | 1.00 |
| Total Weight | 1005.6 | 100.0 |

[1]TAMOL 165A is a polymeric dispersion from Rohm and Haas Co.
[2]IGEPAL CTA 639W is a modified alkylphenol ethoxylate surfactant from Rhodia.
[3]BYK 022 is a silicone-based defoamer from BYK-Chemie USA.
[4]ACRYSOL RM-825 is an acrylic thickener polymer from Rohm and Haas Co.
[5]Dupont R-706 is a rutile titanium dioxide pigment from Dupont Company.
[6]NUOCURE CK-10 is a water-dispersible drier from Condea Servo.
[7]Colliod 645 is an oil-based defoamer from Rhodia.
[8]SANTICIZER 160 is 1,2-benzenedicarboxylic acid, butyl phenylmethyl ester, o-phthalic acid, n-butylbenzyl ester from Solutia Inc.
[9]Dow DB is butyl carbotil from Dow Chemical Co.
[10]Dow DPnB is dipropylene glycol n-butyl ether from Dow chemical Co.

A standard interior gloss paint using EPS 2602 (a water-reducible alkyds commercially available from EPS) was prepared at the PVC of 21.8%, and volume solid of 32.4% for comparison purposes as shown in Table II below.

TABLE II

Standard Interior Gloss Paint

|  | Pounds | Gallons |
| --- | --- | --- |
| EPS 2602[1] | 298.20 | 33.43 |
| BYK 024[2] | 4.77 | 0.55 |
| TAMOL 681[3] | 4.81 | 0.53 |
| 5% Calcium | 2.61 | 0.33 |
| RCL 535[4] | 237.32 | 6.80 |
| DISPERSE |  |  |
| Water | 438.49 | 52.64 |
| Cobalt Hydro-Cure II[5] | 1.39 | 0.18 |
| 12% Zirconium | 5.76 | 0.67 |
| Dow DPnB[6] | 13.25 | 1.81 |
| Water | 20.98 | 2.50 |
| ACRYSOL RM-825[7] | 4.87 | 0.56 |
| Total Weight | 1032.3 | 100.00 |

[1]EPS 2602 is a solventborne alkyd from EPS.
[2]BYK 024 is a silicone-based defoamer from BYK-Chemie USA.
[3]TAMOL 681 is an acrylic dispersion polymer from Rohm and Haas Co.
[4]RCL 535 is coalescent solvent from Union Carbide.
[5]Cobalt Hydro-cure II is the surfactant-modified cobalt salts of neodecanoic acid from CMG America.
[6]Dow DPnB is dipropylene glycol of n-butyl ether from Dow Chemical.
[7]ACRYSOL RM-825 is an acrylic thickener polymer from Rohm and Haas Co.

Each of the above-noted interior paints, along with two commercially available solventborne alkyd paints (Conco Pro 501P Gloss Alkyd from Smiland Paint, and Duron Everlast 47 914 Gloss Alkyd from Duron Paint), were applied to a wood substrate for evaluation via known ASTM methods, and the results are shown in Table III below.

TABLE III

Evaluation of Interior Gloss Paints

| Performance | EMULSION NO. 1 | EPS 2602 | CONCO PRO 501P | DURON EVERLAST |
|---|---|---|---|---|
| Color stability (ASTM E313) | | | | |
| Initial yellowing index | 2.97 | 6.20 | 7.40 | 5.30 |
| Accelerated yellowing index | 2.75 | 17.39 | 19.70 | 18.40 |
| Difference in yellowing index | −0.22 | +11.19 | +12.3 | +13.1 |
| Gloss stability (ASTM D523) (60° Gloss) | | | | |
| Initial gloss | 89.2 | 87.8 | 88.6 | 88.8 |
| After 3 days | 89.4 | 86.2 | 86.1 | 88.5 |
| After 1 week | 88.8 | 85.5 | 85.9 | 86.7 |
| After 2 weeks | 88.4 | 84.0 | 84.8 | 86.2 |
| After 3 weeks | 88.1 | 82.0 | 83.2 | 85.0 |
| After 4 weeks | 87.5 | 81.5 | 83.0 | 85.0 |

TABLE IV

60° Gloss Stability

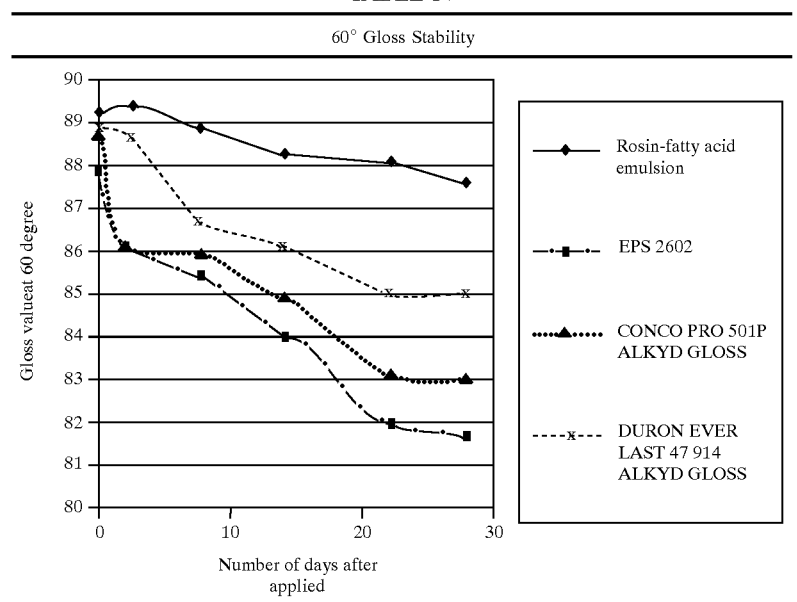

In Table IV above, the 60° gloss stability data determined by the ASTM D523 method was plotted between gloss value versus numbers of days after being applied to the substrate. The data in Table IV show that the paint formulated with the rosin-fatty acid vinylic emulsion composition (Emulsion No. 1) exhibited superior color stability when compared to the standard water-reducible alkyd-based paint (EPS 2602), and the standard solventborne alkyd-based paints (Conco Pro 501P Gloss Alkyd, and Duron Everlast 47 914 Gloss Alkyd).

The gloss stability of the distinctiveness-of-image (i.e., gloss at 20°) of the emulsion-based paint was comparable to those of the standard water-reducible and solventborne alkyd-based paints. Moreover, as shown in Table IV above, the 60° gloss stability of the emulsion-based paint was superior to those of the standard water-reducible and solventborne alkyd-based paints.

EXAMPLE 4

An overprint varnish incorporating the rosin-fatty acid vinylic emulsion composition of Example No. 1 (Emulsion No. 1) was prepared by mixing ingredients in the order shown in Table V below for about 20 minutes.

TABLE V

Overprint Varnish Containing Rosin-Fatty Acid Vinylic Emulsion

| MATERIALS | WEIGHT (in grams) |
|---|---|
| Emulsion No. 1 | 94.0 |
| SURFYNOL DF-37[1] | 0.2 |
| Polyemulsion 392N35[2] | 4.0 |
| Dow Corning 51 additive[3] | 0.2 |
| SURFYNOL OP-340[4] | 0.6 |
| Water | 1.0 |
| Total Weight | 100.0 |

TABLE V-continued

Overprint Varnish Containing Rosin-Fatty Acid Vinylic Emulsion

| MATERIALS | WEIGHT (in grams) |
| --- | --- |

(1)SURFYNOL DF-37 is a non-ionic, acetylenic-based defoamer from Air Products.
(2)Polyemulsion 392N35 is a wax emulsion from Chemcor.
(3)Dow Corning 51 additive is a silicone additive from Dow Corning.
(4)SURFYNOL OP-340 is a non-ionic, acetylenic-based surfactant from Air Products.

A standard waterborne high gloss overprint varnish Charis ML 1900 (a high gloss overprint varnish commercially available from Johnson Polymer) was utilized for comparison purposes.

Emulsion No. 1, the overprint varnish containing Emulsion No. 1, and the standard overprint varnish (Charis ML 1900) were each adjusted to a viscosity of 15 seconds on a Zahn 3 cup, and applied to Lenetta N2C with a #3 Meyer Rod. The resulting prints were dried at 100° C., and aged at room temperature for one hour before testing. The gloss of the prints were measured eight times using the ASTM D523 method. The average of eight gloss number readings are reported in Table VI below.

TABLE VI

Gloss Evaluations

|  | Emulsion No. 1 | Overprint Varnish Containing Emulsion No. 1 | Standard Overprint Varnish (Claris ML 1900) |
| --- | --- | --- | --- |
| 20° Gloss | 47–51 | 33–44 | 32–33 |
| 60° Gloss | 88–92 | 82–88 | 81–83 |

Table VI shows that the rosin-fatty acid vinylic emulsion composition (Emulsion No. 1) exhibited an ultra high gloss at 60° and an ultra high distinctive-of-image gloss (i.e., gloss at 20°). The overprint varnish formulated with the rosin-fatty acid vinylic emulsion composition (Emulsion No. 1) exhibited comparable, if not superior, gloss at both 20° and 60° when compared to the standard high gloss overprint varnish (Claris ML 1900).

EXAMPLE 5

A rosin-fatty acid vinylic emulsion composition was prepared via the following method. A reactor vessel equipped with a thermometer, stirrer, monomer feed pump, and a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials from the resulting rosin-fatty acid vinylic polymer.

A round bottom flask was equipped with stirrer, thermometer, nitrogen inlet and reflux condenser. To the flask was added 508 g of deionized water (DIW), which was heated to 75° C. Then 65 g of the rosin-fatty acid vinylic polymer and 65 g of JONREZ H-2700 (a styrene acrylic resin commercially available from Westvaco Corporation) was added to the flask. Ammonium hydroxide was subsequently added to the mixture until a pH of 8.5–9.0 was obtained; at which time 4.0 g of polypropylene glycol was added and the temperature of the solution increased to 81 ° C. An initiator solution composed of 3.5 g ammonium persulfate and 20 g DIW was charged to the flask. Five minutes after this addition was completed, as solution of 189 g of methyl methacrylate, 81 g of butylacrylate monomer, and 8 g of Tergitol 15-S-9 (a non-ionic surfactant commercially available from Union Carbide) were charged to the flask over a period of 90 minutes. After this addition was completed, 40 g DIW was used to rinse the feed lines. The reaction was held at temperature for 60 minutes, then allowed to cooled down to room temperature and filtered. The resulting rosin-fatty acid vinylic emulsion composition contained 44% solids and had a pH of 8.22.

An aqueous ink was prepared by adding 40 g of the rosin-fatty acid vinylic emulsion to 60 g of FLEXIVERSE Red RFD 4247 (an ink dispersion commercially available from dispersion Sun Chemical Company) while stirring. The resulting ink (hereafter referred to as "Ink No. 1") was then diluted with water to achieve the viscosity of 28.2 seconds using #2 Zahn cup.

A standard aqueous ink was prepared for comparison purposes by adding 40 g of JONREZ 2050 (an emulsion commercially available from Westvaco Corporation) to 60 g of FLEXIVERSE Red RFD 4247 (an ink dispersion commercially available from dispersion Sun Chemical Company) while stirring. The resulting ink (hereafter referred to as "Standard Ink") was diluted with water to achieve the viscosity of 28.0 seconds using a #2 Zahn cup After polyethylene film was corona treated, the inks were applied to the film using a 165 line anilox handproofer. The inks were dried in a 60° C. oven for 10 seconds then allowed to set for 60 minutes. The adhesion of the ink was then measured via a standard tape test in which 3M 610 tape was applied to the printed polyethylene with moderate pressure. The tape was quickly removed, and the amount of ink remaining on the polyethylene substrate was evaluated as a percent. After the procedure was repeated three times on different printed stock, and the results of the three measurements were averaged. Ink No. 1 (the ink formulated with the rosin-fatty acid vinylic emulsion composition) exhibited superior adhesion properties, showing a 100% adhesion to the polyethylene substrates. In contrast, the Standard Ink exhibited a 40% adhesion to the polyethylene substrates.

The ability of the inks to remain stabile over time was also evaluated. The inks were first stored for 12 hours in a 60° C. oven, after which time the viscosity was measured. The inks were subsequently stored at room temperature for three weeks and the viscosities were measured each week. The results are shown in Table VI below.

TABLE VII

Viscosity Evaluations Of Ink Formulations

| Period | Ink No. 1 (seconds) | Standard Ink (seconds) |
|---|---|---|
| Initial | 28.2 | 28.0 |
| 12 hours at 60° C. | 29.2 | 30.1 |
| 1 Week | 31.2 | 33.1 |
| 2 Weeks | 31.8 | 33.2 |
| 3 Weeks | 32.7 | 34.0 |

The viscosity was measured in seconds using a #2 Zahn cup.

As shown in Table VII above, the ink formulated with the rosin-fatty acid vinylic emulsion composition (Ink No. 1) exhibited superior viscosity stability when compared to the Standard Ink.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A rosin-fatty acid vinylic emulsion composition comprising the reaction product produced by:
    (A) reacting in a polymerization reaction:
        (1) about 20.0% to about 60.0% by total weight of the reactants of a fatty acid rosin mixture comprising:
            (a) about 10.0% to about 90.0% by total weight of the fatty acid rosin mixture of fatty acid, and
            (b) about 10.0% to about 90.0% by total weight of the fatty acid rosin mixture of rosin; and
        (2) about 40.0% to about 80.0% by total weight of the reactants of a monomer mixture comprising:
            (a) about 15.0% to about 45.0% by total weight of the monomer mixture of a member selected from the group consisting of acrylic acid, methacrylic acid, fumaric acid, maleic anhydride, and combinations thereof,
            (b) about 55.0% to about 85.0% by total weight of the monomer mixture of a member selected from the group consisting of non-carboxylic acid group containing vinylic monomers and combinations thereof,
            (c) about 0.5% to about 5.0% by total weight of the monomer mixture of a polymerization initiator,
            (d) up to about 4.0% by total weight of the monomer mixture of a chain transfer agent, and
            (e) up to about 30% by total weight of the monomer mixture of a hydrocarbon solvent,
        at a temperature in the range of about 135° C. to about 175° C. to produce a rosin-fatty acid vinylic polymer having a weight average molecular weight in the range of about 4,000 to about 12,000; and
    (B) further reacting in an emulsion polymerization reaction:
        (1) about 5.0% to about 90.0% by total weight of the reactants of the rosin-fatty acid vinylic polymer of step A,
        (2) about 10.0% to about 95.0% by total weight of the reactants of a member selected from the group consisting of vinylic monomers and combinations thereof, and
        (3) about 0.5% to about 4.0% by total weight of the reactants of a polymerization initiator,
        (4) up to about 4.0% by total weight of the reactants of a chain transfer agent, and
        (5) up to about 4.0% by total weight of the reactants of a surfactant,
    at a temperature in the range of about 20° C. to about 100° C. to produce a rosin-fatty acid vinylic emulsion composition with polymers having a weight average molecular weight in the range of about 40,000 to about 200,000.

2. The rosin-fatty acid vinylic emulsion composition of claim 1 which further comprises the reaction product produced by:
    (A) reacting in a polymerization reaction:
        (1) about 20.0% to about 60.0% by total weight of the reactants of a fatty acid rosin mixture comprising:
            (a) about 20.0% to about 50.0% by total weight of the fatty acid rosin mixture of fatty acid, and
            (b) about 50.0% to about 80.0% by total weight of the fatty acid rosin mixture of rosin; and
        (2) about 40.0% to about 80.0% by total weight of the reactants of a monomer mixture comprising:
            (a) about 20.0% to about 25.0% by total weight of the monomer mixture of a member selected from the group consisting of acrylic acid, methacrylic acid, fumaric acid, maleic anhydride, and combinations thereof,
            (b) about 60.0% to about 70.0% by total weight of the monomer mixture of a member selected from the group consisting of non-carboxylic acid group containing vinylic monomers and combinations thereof,
            (c) about 1.0% to about 3.0% by total weight of the monomer mixture of a polymerization initiator,
            (d) about 0.5% to about 2.0% by total weight of the monomer mixture of a chain transfer agent, and
            (e) about 1.0% to about 4.0% by total weight of the monomer mixture of a hydrocarbon solvent,
        at a temperature in the range of about 140° C. to about 170° C. to produce a rosin-fatty acid vinylic polymer having a weight average molecular weight in the range of about 5,000 to about 11,000; and
    (B) further reacting in an emulsion polymerization reaction:
        (1) about 20.0% to about 60.0% by total weight of the reactants of the rosin-fatty acid vinylic polymer of step A,
        (2) about 40.0% to about 80.0% by total weight of the reactants of a member selected from the group consisting of vinylic monomers and combinations thereof, and
        (3) about 0.5% to about 1.5% by total weight of the reactants of a polymerization initiator,
        (4) up to about 4.0% by total weight of the reactants of a chain transfer agent, and
        (5) up to about 4.0% by total weight of the reactants of a surfactant,
    at a temperature in the range of about 60° C. to about 85° C. to produce a rosin-fatty acid vinylic emulsion composition with polymers having a weight average molecular weight in the range of about 40,000 to about 180,000.

3. The rosin-fatty acid vinylic emulsion composition of claim 1 wherein the fatty acid is a member selected from the group consisting of fatty acids containing from 12 to 24 carbon atoms and combinations thereof.

4. The rosin-fatty acid vinylic emulsion composition of claim 1 wherein the rosin is a member selected from the group consisting of tall oil rosin, wood rosin, gum rosin, and combinations thereof.

5. The rosin-fatty acid vinylic emulsion composition of claim 1 wherein the vinylic monomer in step B is a member selected from the group consisting of styrenic monomers, acrylic monomers, methacrylic monomers, ethylenic monomers, and combinations thereof.

6. The rosin-fatty acid vinylic emulsion composition of claim 1 wherein the non-carboxylic acid group containing vinylic monomer portion of the monomer mixture comprises at least one monoalkenyl aromatic monomer and at least one acrylic monomer.

7. The rosin-fatty acid vinylic emulsion composition of claim 6 wherein the monoalkenyl aromatic monomer is a member selected from the group consisting of alpha-methyl styrene, styrene, vinyl toluene, tertiary butyl styrene, ortho-chlorostyrene, and combinations thereof.

8. The rosin-fatty acid vinylic emulsion composition of claim 1 wherein the vinylic monomer in step B is a member selected from the group consisting of acrylic acid, methacrylic acid, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methyl acrylate, ethyl acrylate, n-propyl acrylate, isopropyl acrylate, n-butyl acrylate, n-decyl acrylate, 2-ethylhexal acrylate, salts of methacrylic acid, methacrylonitrile, methacrylamide, N-methylmethacrylamide, N-ethylmethacrylamide, N,N-diethymethacrylamide, N,N-dimethylmethacrylamide, N-phenylmethacrylamide, methacrolein, salts of acrylic acid, acrylonitrile, acrylamide, methyl alpha-chloroacrylate, methyl 2-cyanoacrylate , N-ethylacrylamide, N,N-diethylacrylamide acrolein, vinyl acetate, vinyl chloride, vinyl pyridine, vinyl pyrollidone, sodium crotonate, methyl crotonate, crotonic acid, maleic anhydride, and combinations thereof.

9. The rosin-fatty acid vinylic emulsion composition of claim 1 wherein the polymerization initiator in the initial polymerization reaction is a member selected from the group consisting of t-butyl peroxide, t-butyl peroxybenzoate, t-butyl peroctoate, cumene hydroperoxide, azobisisobutyronitrile, benzoyl peroxide, and combinations thereof.

10. The rosin-fatty acid vinylic emulsion composition of claim 1 wherein the polymerization initiator in the emulsion polymerization reaction is a member selected from the group consisting of thermal initiators, redox initiators, and combinations thereof.

11. The rosin-fatty acid vinylic emulsion composition of claim 10 wherein the thermal initiator is a member selected from the group consisting of hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, isopropyl peroxycarbonate, and combinations thereof.

12. The rosin-fatty acid vinylic emulsion composition of claim 10 wherein the redox initiator is a member selected from the group consisting of sodium persulfate-sodium formaldehyde sulfoxylate, cumene hydroperoxide-sodium metabisulfite, potassium persulfate-sodium metabisulfite, potassium persulfate-sodium bisulfite, cumene hydroperoxide-iron (II) sulfate, and combinations thereof.

13. The rosin-fatty acid vinylic emulsion composition of claim 1 wherein the chain transfer agent is a member selected from the group consisting of dodecyl mercaptan, mercaptoacetic acid, mercaptopropionic acid, octyl mercaptan, 2-mercaptoethanol, and combinations thereof.

14. The rosin-fatty acid vinylic emulsion composition of claim 1 wherein the hydrocarbon solvent is a member selected from the group consisting of aromatic solvents, aliphatic solvents, and combinations thereof.

15. The rosin-fatty acid vinylic emulsion composition of claim 1 wherein the surfactant is a member selected from the group consisting of anionic surfactants, non-ionic surfactants, and combinations thereof.

16. An aqueous paint comprising the rosin-fatty acid vinylic emulsion composition of claim 1.

17. The aqueous paint of claim 16 comprising the rosin-fatty acid vinylic emulsion composition of claim 1 and a pigment dispersion.

18. An aqueous overprint varnish comprising the rosin-fatty acid vinylic emulsion composition of claim 1.

19. An aqueous ink comprising the rosin-fatty acid vinylic emulsion composition of claim 1 and a pigment dispersion.

* * * * *